United States Patent Office 3,577,520
Patented May 4, 1971

3,577,520
DENTIFRICE COMPOSITIONS CONTAINING 5,5-DIARYL - 2,4 - IMIDAZOLIDINEDIONES AND PROCESS OF TREATING PYORRHEA
Emile Constantin Savini, 44 Rue du Magasin a Poudre, 14 Caen, France, and Robert Poitevin, 6 Rue Anatole de la Forge, 75 Paris 17, France
No Drawing. Continuation-in-part of application Ser. No. 669,271, Sept. 20, 1967. This application Dec. 19, 1969, Ser. No. 886,754
Int. Cl. A61k 7/16
U.S. Cl. 424—54                    8 Claims

ABSTRACT OF THE DISCLOSURE

This invention relates to dentifrice compositions for treatment of dental alveolus pyorrhea containing a safe but effective amount of 5,5-diaryl-2,4-imidazolidinediones and to the method of treatment of dental alveolus pyorrhea which comprises topically applying to the effected area of the gums a dentifrice composition containing a safe but effective amount of 5,5-diaryl-2,4-imidazolidinediones.

REFERENCE TO COPENDING APPLICATION

This application is a continuation-in-part of our copending United States patent application Ser No. 669,271, filed Sept. 20, 1967, now abandoned.

THE PRIOR ART

Parodontosis, formerly called dental alveolus pyorrhea, is a disease of tropic nature consisting in the destruction of cells due to alveolar processes of the bone structure of the tooth and adjacent conjunctive tissue. It results in the loosening and falling out of the teeth.

The local sympathetic unbalance, frequently associated with a general neuro-vegetative disturbance, creates a condition which often promotes a secondary infection intensifying the process of tissue destruction.

Up to now, no truly effective treatment for this condition has been discovered, the physician specializing in stomatology finds himself at more or less short notice, obliged to resort to the extraction of loose and infected teeth.

Previous workers have suggested that the oral administration of the sodium salt of 5,5-diphenyl-2,4-imidazolidine-3,5-dione might be a useful aid in the healing process when parodontal disease is to be treated particularly in connection with the re-attachment operation in view of the gingival hyperplasia noted when the above drug is orally utilized in the treatment of epilepsy as an anticonvulsant. Recent studies, however, have shown that the oral administration of the sodium salt of 5,5-diphenyl-2,4-imidazolidine-3,5-dione hinders, rather than improves, the healing of wounds.

OBJECTS OF THE INVENTION

An object of the present invention is the development of a therapeutic regime combatting dental alveolus pyorrhea.

Another object of the invention is the obtention of a dentifrice composition for the treatment of dental alveolus pyorrhea containing a safe but effective amount of 5,5-diaryl-2,4-imidazolidinediones selected from the group consisting of compounds of the formula

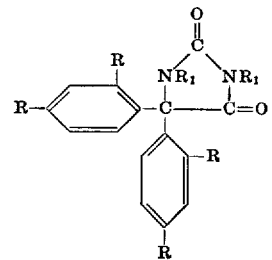

wherein R is a substituent selected from the group consisting of hydrogen, chloro, bromo and hydroxy and $R_1$ is a substituent selected from the group consisting of hydrogen, methyl and ethyl, and their alkali metal salts.

A further object of the invention is the development of a method for treatment of dental alveolus pyorrhea which comprises topically applying to the effected area of the gums a safe but effective amount of 5,5-diaryl-2,4-imidazolidinediones selected from the group consisting of compounds of the formula wherein R is a substituent selected from the group consisting of hydrogen, chloro, bromo and hydroxy and $R_1$ is a substituent selected from the group consisting of hydrogen, methyl and ethyl, and their alkali metal salts.

These and other objects of the invention will become more apparent as the description thereof proceeds.

DESCRIPTION OF THE INVENTION

The stimulating action on the conjunctive tissue and the vascular neoformation produced by various types of medicines and, in particular, their therapeutic action exerted on the surface of the gums, has now been studied. As a result of this study, a therapeutic action was observed in parodontosis by the utilization, as a local application of 1 mg. to 20 mg. per application of the derivatives of 5,5-diaryl-2,4-imidazolidinedione, with a phenyl nucleus which may carry chloro, bromo or hydroxy substituents in the 2-, 4-, 2,2'-, 2,4'-positions, as well as the methyl and ethyl derivatives in the 1- and 3-positions, of these substituted diaryl-imidazolidinediones. In particular, the therapeutically active 5,5-diaryl-2,4-imidazolidinediones have the formula

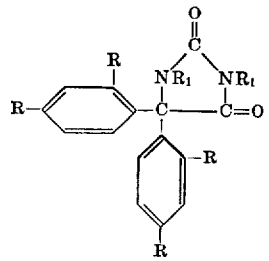

wherein R is a substituent selected from the group consisting of hydrogen, chloro, bromo and hydroxy and $R_1$ is a substituent selected from the group consisting of hydrogen, methyl and ethyl, as well as the alkali metal salts of these compounds. The preferred compound for the best therapeutic effectiveness is 5,5 - di - (4' - chlorophenyl)-2,4-imidazolidine-3,5-dione and its alkali metal salt, particularly the sodium salt, which compound is practically devoid of an anti-epileptic effect. Another preferred compound for therapeutic effectiveness is 5,5-diphenyl-2,4-imidazolidine-dione and its alkali metal salts, particularly the sodium salt. Preferably, local applications of the therapeutic agents of the invention are made once, twice or three times a day in amounts of from 1 mg. to 20 mg. per application for periods of 1 to 3 months. These applications are preferably made in such a manner as to stimulate the tissue of the gums simultaneously.

The derivatives of the invention are, therefore, preferably incorporated into a dentifrice paste, which is applied onto the gums, accelerating the penetration into the gums by brushing or massage with the fingers, although other methods of topical application known to those skilled in the art can be utilized.

The derivatives may also be incorporated in a dentifrice cream, in a gingival paste or in a masticatory paste. The active compound is present in the compositions in amounts of between about 0.5% and 10% by weight. The pH of the composition is preferably situated above 7.

The synthesis of 5,5-diaryl-2,4-imidazolidine-diones is effected by reacting a benzil which can have on one or both rings the desired chloro, bromo or hydroxy substituents, with a solution of urea or substituted urea in ethanol in the presence of sodium ethanolate.

The reaction occurs according to the following flow diagram

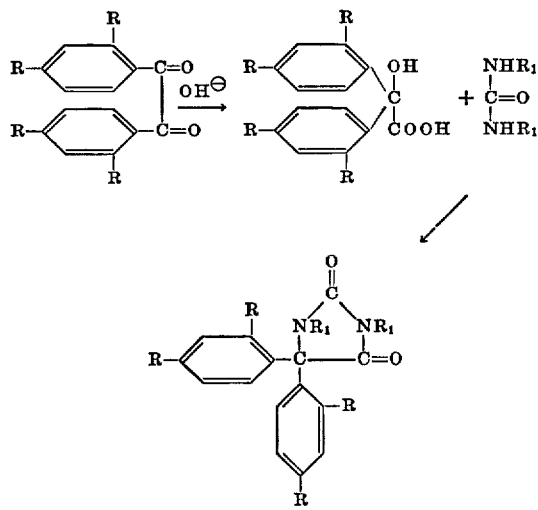

where R and $R_1$ have the above-noted meanings.

The 2,4-imidazolidinediones, substituted in the 3-position, can also be obtained by direct alkylation of the nucleus. The substitution in the 1-position is obtained by reaction in the course of the synthesis with a prealkylated urea molecule.

The following specific embodiments are illustrative of the invention. It is to be understood, however, that they are not to be deemed limitative in any manner.

EXAMPLE 1

Preparation of 5,5-di-(4'-chlorophenyl)-2,4-imidazolidine-dione 12 gm. of urea was dissolved with heating in an ethanolic solution of sodium ethanolate prepared by the addition of 16 gm. of metallic sodium to 800 cc. of ethanol. 18 gm. of 4,4-dichlorodibenzoyl was added to the solution and the mixture was heated to reflux for a period of five hours. Thereafter, the reaction mixture was subjected to distillation to distill part of the ethanol which was replaced by water. The mixture was then cooled and filtered under vacuum. A stream of carbon dioxide was passed through the filtrate. The precipitate obtained was filtered, washed with water and vacuum filtered. 5,5-di-(4'-chlorophenyl)-2,4-imidazolidine-dione was thus obtained. The product was purified by dissolution in diluted aqueous sodium hydroxide, precipitation by carbon dioxide and recrystallization from methanol and ethanol. Yield=65%.

The product occurred in the form of an odorless and insipid crystalline powder having a melting point of 315° to 320° C. The product is insoluble in water, slightly soluble in the usual organic solvents and soluble in aqueous solutions of alkali metal hydroxides.

Analysis.—$C_{15}H_{10}N_2O_2Cl_2$; molecular weight=321.15. Calculated (percent): C, 56.12; H, 3.11; N, 8.72. Found (percent): C, 56.20; H, 3.25; N, 8.67.

EXAMPLE 2

Preparation of a dentifrice paste

The following ingredients were mixed together to obtain a dentifrice paste containing 1% of the sodium salt of 5,5-diphenyl-2,4-imidazolidine-dione.

| | Grams |
|---|---|
| Powdered soap | 2.73 |
| Tertiary calcium phosphate | 9.54 |
| Calcium carbonate | 47.73 |
| Glycerol | 80.00 |
| 5,5-diphenyl-2,4-imidazolidine-dione sodium salt | 1.40 |
| | 141.40 |

EXAMPLE 3

The following ingredients were mixed together to obtain a dentifrice paste containing 1% of 5,5-di-(4'-chlorophenyl)-2,4-imidazolidine-dione.

| | Grams |
|---|---|
| Powdered soap | 2.73 |
| Tertiary calcium phosphate | 9.54 |
| Calcium carbonate | 47.73 |
| Glycerol | 80.00 |
| 5,5 - di - (4' - chlorophenyl)-2,4-imidazolidine-dione | 1.40 |
| | 141.40 |

This recipe gives one tube of dentifrice for local applications.

OTHER GINGIVAL PASTES OF THE INVENTION

EXAMPLE 4

¾% paste

| | Grams |
|---|---|
| Calcium carbonate | 39.0 |
| Water | 32.0 |
| Glycerol | 20.0 |
| Soap | 5.3 |
| Gum arabic | 0.4 |
| Saccharin | 0.1 |
| Oil of mint | 0.2 |
| 5,5 - di - (4'-chlorophenyl) - 2,4 - imidazolidine-salt) | 3.0 |
| | 100.0 |

EXAMPLE 5

2.7% paste

| | Grams |
|---|---|
| Calcium carbonate | 45.0 |
| Wheat starch | 7.0 |
| Glycerol | 26.2 |
| Water | 14.4 |
| Sodium benzoate | 2.2 |
| Perfumes (synthetic essences) | 1.3 |
| Sodium salt of sulfuric acid esters of monoglycerides of fatty acids having 18 or more carbon atoms) | 1.2 |
| 5,5 - di - (4' - chlorophenyl) - 2,4 - imidazolidine-dione | 2.7 |
| | 100.0 |

EXAMPLE 6

1.85% paste

| | Grams |
|---|---|
| Tricalcium phosphate | 41.00 |
| Sodium sulforicinoleate | 2.00 |
| Water | 28.00 |
| Glycerol | 25.00 |
| Agar-agar | 1.45 |
| Saccharin | 0.10 |
| Lemon oil | 0.60 |
| 5,5 - di - (4' - chlorophenyl) - 2,4 - imidazolidine-dione (sodium salt) | 1.85 |
| | 100.0 |

EXAMPLE 7

0.5% paste

| | Grams |
|---|---|
| Sodium polymetaphosphate | 26.0 |
| Dicalcium phosphate | 26.0 |
| Gum arabic | 1.3 |
| Sodium laurylsulfate | 1.1 |
| Glycerol | 18.0 |
| Water | 27.0 |
| Anise oil | 0.1 |
| 5,5 - di - (4' - chlorophenyl) - 2,4 - imidazolidine-dione (sodium salt) | 0.5 |
| | 100.0 |

EXAMPLE 8

1.55% paste

| | Grams |
|---|---|
| Colloidal aluminum hydroxide | 33.00 |
| Aluminum oxide | 12.90 |
| Glycerol | 28.00 |
| Water | 23.00 |
| Sodium laurylsulfoacetate | 1.00 |
| Sodium alginate | 0.50 |
| Peppermint oil | 0.70 |
| Propyl p-hydroxybenzoate | 0.20 |
| Saccharin | 0.05 |
| 5,5 - di - (4' - chlorophenyl) - 2,4 - imidazolidine-dione (sodium salt) | 1.55 |
| | 100.0 |

EXAMPLE 9

2.5% paste

| | Grams |
|---|---|
| Precipitated chalk | 40.0 |
| Glycerol | 25.0 |
| Sodium laurylsulfate | 2.0 |
| Carboxymethylcellulose 1000 | 2.0 |
| Benzoin oil | 1.4 |
| Methyl p-hydroxybenzoate | 0.1 |
| Distilled water | 27.0 |
| 5,5 - di - (4' - chlorophenyl) - 2,4 - imidazolidine-dione | 2.5 |
| | 100.0 |

EXAMPLE 10

Clinical results

The experiment was carried out on 14 patients, exhibiting signs of parodontosis, either in the parodontosic stage or in the parodontitis stage.

In order to give to the results all of their scientific values, after having conducted a minute clinical and radiological examination, the determination of the results was particularly made on an anatomic-pathological study based on a sample of the gingiva. This study was without question the only indisputable proof.

A first group of 7 patients was treated over a period of 1½ months with the dentifrice paste of Example 2, containing 1% of 5,5-diphenyl - 2,4 - imidazolidine-dione (sodium salt). The patients utilized the dentifrice paste of Example 2 by applying the paste to a finger and massaging the gums for a period of 5 to 10 minutes at least twice a day. The paste was then rinsed from the mouth by water. After 1½ months a sample of the gingiva was taken from each patient.

A second group of 7 patients received the treatment over a period of 3 months. After 1½ months a sample of the gingiva was taken and a second sample was taken at the end of the 3 months, for purpose of verification.

The anatomic-pathological examinations showed in all of the cases a considerable improvement directed toward complete cure.

A total change in the gingiva mucous membrane was observed, as well as with regard to the epithelium as with the chorion, and this change became more complete the longer the treatment was given. This change contributed to the healing of the lesions noted on the samples taken in the beginning of the treatment.

Moreover, an extremely important characteristic was observed in two patients treated over a period of 2 months, a second verification sample taken one month after complete arrest of the therapy showed unquestionably a stabilization of the healing obtained.

The results can be summarized with the statement that there does exist at the present a treatment of parodontosis which acts, by repairing the injured tissue, to promote a complete healing of the lesions. No other previous therapeutic has ever accomplished the repair of the lesions of parodontosis.

With regard to the osseous lesions, it is too early to superimpose the radiographs, since numerous months or even years are necessary in order to perceive a reconstruction, which has been rendered possible by this treatment.

EXAMPLE 11

Clinical results

This experiment was carried out on 25 patients exhibiting signs of parodontosis for a period of six months.

After brushing their teeth, the patients applied the dentifrice paste of Example 3 containing 1% of 5,5-di(4'-chlorophenyl) - 2,4 - imidazolidine-dione to a finger and massaged the gums for a period of 5 to 10 minutes, at least twice a day. The paste was then rinsed from the mouth by water.

A sample of the gingiva was taken from each patient at the beginning of the treatment and after 3 months and 6 months of treatment. The following observations were noted.

Observation I: M.B., 22 years old; clinically evident parodontitis.

1st Taking (before the treatment): Inflammatory lesions evolving in an acute manner, important hemorrhagic suffusion, very abundant inflammatory infiltrate with numerous polynuclearies.

2nd Taking (after 3 months of treatment): A clearly different aspect from the 1st taking.

3rd Taking (after 6 months of treatment): Images of indurated scarry lesions, thus healing of the lesions; the patient noted the disappearance of the symptoms of the malady and the gingival mucous membranes have returned to a normal aspect.

The other observations have shown identical results.

The results of these last two examples are capable of becoming further improved by the association, with the derivatives of the imidazolidinedione, of substances possessing a local anesthetic action, such as procaine. In this case, the stimulating action on the conjunctive tissue of the first series of substances is found to be completed and intensified by the trophic effects of the procaine (or any other local anesthetics). The results obtained until now show that this medicinal association is capable of bringing about in the case of parodontosis, the anatomical healing together with the repair and re-vascularization of the gingiva tissue.

It should be understood that the invention is not limited to the specific embodiments as cited and described previously. It is obvious that other variants known to those skilled in the art can be employed without departing from the spirit of the invention.

We claim:

1. A dentrifrice composition for the treatment of dental alveolus pyorrhea containing between about 0.5% and 10% by weight of 5,5-diaryl-2,4-imidazolidinediones selected from the group consisting of compounds of the formula

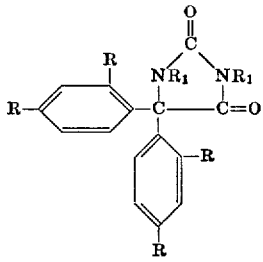

wherein R is a substituent selected from the group consisting of hydrogen, chloro, bromo and hydroxy and $R_1$ is a substituent selected from the group consisting of hydrogen, methyl and ethyl, and their alkali metal salts.

2. The dentifrice composition of claim 1 which contains a safe but effective amount of a local anesthetic.

3. The dentrifice composition of claim 1 wherein said 5,5-diaryl-2,4-imidazolidinedione is the sodium salt of 5,5-diphenyl-2,4-imidazolidinedione.

4. The dentifrice composition of claim 1 wherein said 5,5 - diaryl - 2,4-imidazolidinedione is 5,5-di-(4'-chlorophenyl)-2,4-imidazolidinedione.

5. A method for treatment of dental alveolus pyorrhea which comprises topically applying at least once per day to the affected area of the gums between 1 mg. and 20 mg. per application of 5,5-diaryl-2,4-imidazolidinediones selected from the group consisting of compounds of the formula

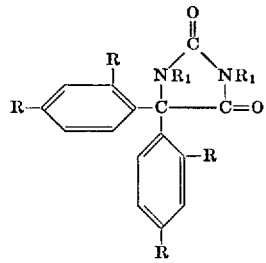

wherein R is a substituent selected from the group consisting of hydrogen, chloro, bromo and hydroxy and $R_1$ is a substituent selected from the group consisting of hydrogen, methyl and ethyl, and their alkali metal salts.

6. The method of claim 5 wherein said 5,5-diaryl-2,4-imidazolidinediones are incorporated in a dentifrice composition.

7. The method of claim 5 wherein said 5,5-diaryl-2,4-imidazolidinedione is the sodium salt of 5,5-diphenyl-2,4-imidazolidinedione.

8. The method of claim 5 wherein said 5,5-diaryl-2,4-imidazolidinedione is 5,5-(4'-chlorophenyl)-2,4-imidazolidinedione.

References Cited

Kelln et al., Dental Progress, vol. 1, pp. 126–129, January 1961.

RICHARD L. HUFF, Primary Examiner

U.S. Cl. X.R.

424—273